Aug. 8, 1933.   J. F. WILCOXSON   1,921,493
CUTTER BAR OPERATING MEANS
Original Filed June 11, 1930    2 Sheets-Sheet 1
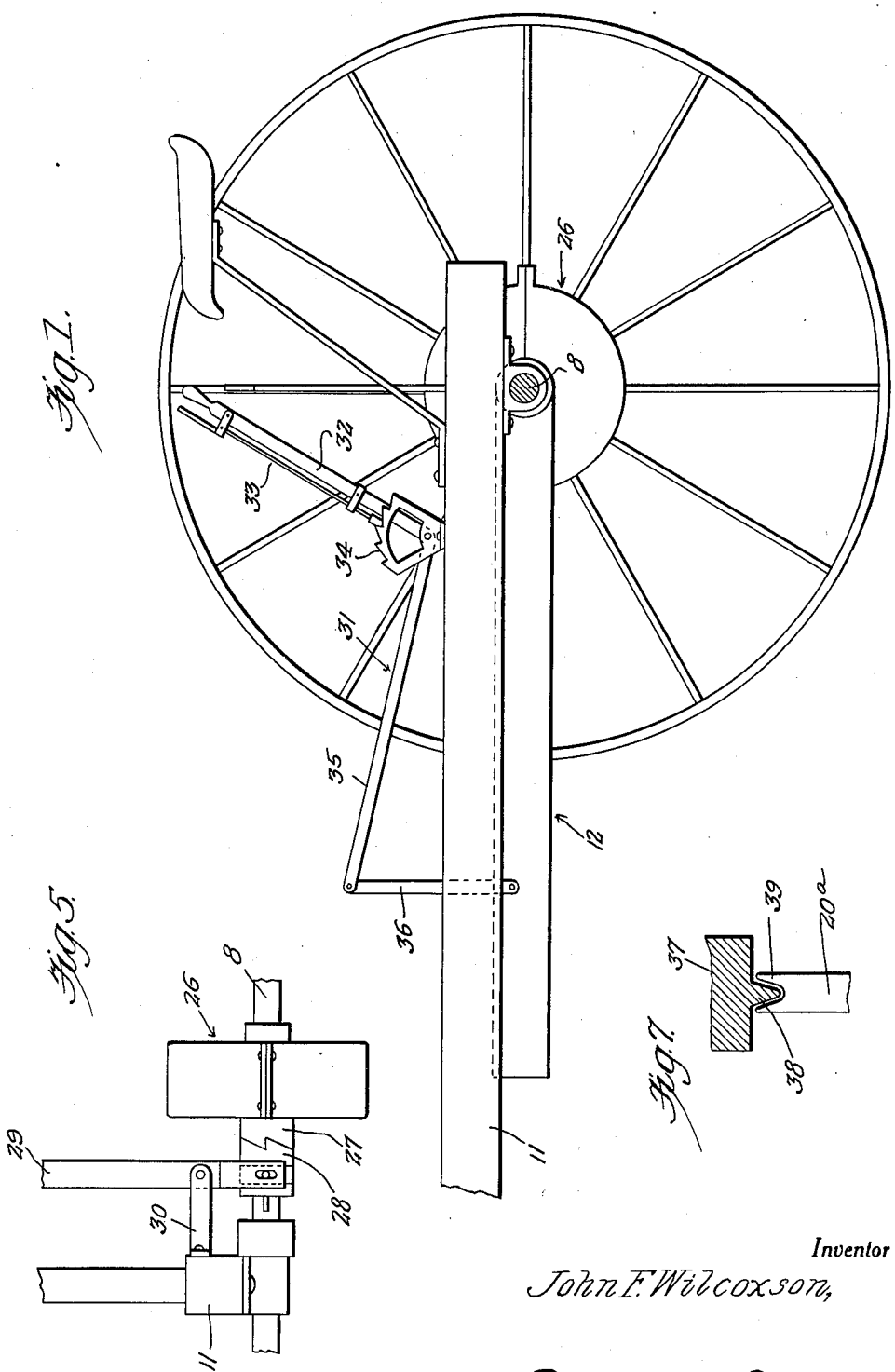
Inventor
John F. Wilcoxson,
By Clarence A. O'Brien
Attorney Aug. 8, 1933.    J. F. WILCOXSON    1,921,493
CUTTER BAR OPERATING MEANS
Original Filed June 11, 1930    2 Sheets-Sheet 2
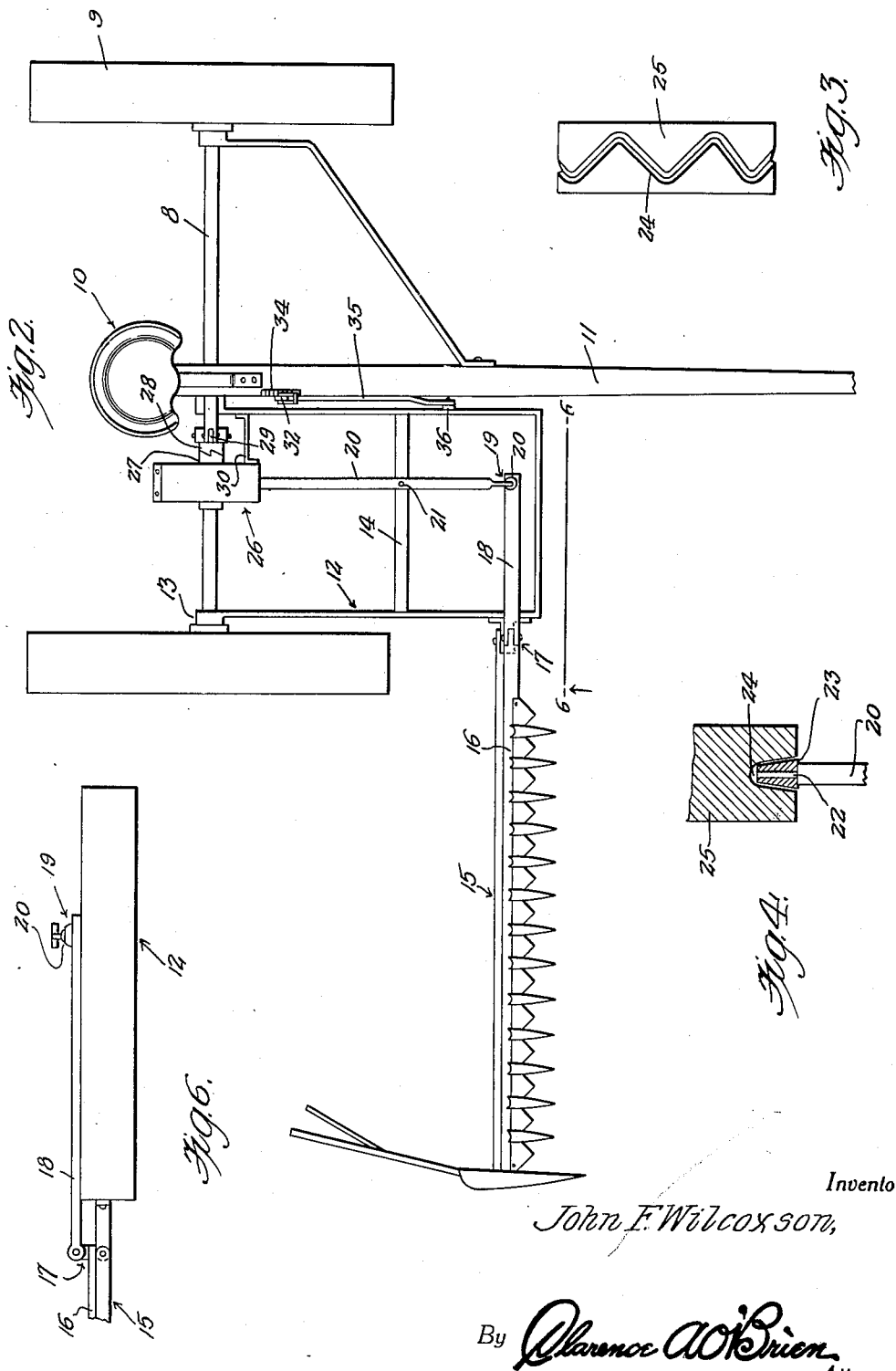
Inventor
John F. Wilcoxson,
By Clarence A. O'Brien
Attorney Patented Aug. 8, 1933

1,921,493

UNITED STATES PATENT OFFICE 1,921,493

CUTTER BAR OPERATING MEANS

John F. Wilcoxson, Vernal, Utah

Application June 11, 1930, Serial No. 460,411
Renewed October 20, 1932

1 Claim. (Cl. 56—272)

The present invention has reference to improved means for actuating a reciprocatory cutter bar such as is used in association with harvesters, mowing machines, and analogous farm implements, and the like.

Briefly stated, the novelty is predicated upon a simplified and dependable mechanism which is associated with a rotary axle in such a manner as to convert rotary motion into reciprocatory motion for the alternately movable cutter bar.

Briefly stated, the structure embodies a lever raised and lowered frame which is pivotally mounted on the axle, said frame constituting a mounting and carrier for a pivotally mounted oscillatory link, said link having operating connection at one end with a rotary device on the axle and having ball and socket connection at its opposite ends to the toothed sliding bar of the cutter bar mechanism.

The primary novelty is predicated upon the utilization of a rotating disc rigidly mounted on the axle and having its peripheral portion provided with a zig-zag actuating means with which the adjacent end of the oscillatory link is operatively associated so that when the axle rotates through the action of the axle, the links will be swung back and forth on its pivot, and by reason of its operating connection with the cutter bar, will convert the rotary motion of the disc into reciprocatory motion for the cutter bar mechanism.

The particular features and advantages will become more readily apparent from the following description and drawings.

In the drawings:

Figure 1 is an elevational view showing the general assembly on a slightly enlarged scale.

Figure 2 is a top plan view showing the complete structure as developed in accordance with the present inventive conception.

Figure 3 is a detail view of one embodiment of the driving disc.

Figure 4 is a view in section showing the operating connection between the links and peripheral portion of the disc.

Figure 5 is an elevational view of the clutch and operating lever therefor.

Figure 6 is a section taken approximately on the plane of the line 6—6 of Figure 2.

Figure 7 is a view like Figure 4, showing a modified form of drive.

In Figure 2, the reference character 8 designates the axle, 9 the wheels, 10 the operator's seat, and 11 the draft tongue.

The numeral 12 designates generally a substantially U-shaped carrier and mounting frame whose arm portions are provided with bearings 13 rockably mounted on the axle. This frame includes a cross piece at 14. The frame is so constructed as to accommodate the cutterbar mechanism generally represented by the numeral 15. In this mechanism is the relatively movable reciprocatory toothed bar 16. As seen in Figure 6 this bar is connected as at 17 with a laterally disposed operating link 18, which in turn has ball and socket connection at 19 with the companion link or lever 20.

This part 20 is pivotally mounted at 21 on the cross bar 14, and as seen in Figure 4, the rear end of the lever 20 is provided with a spindle 22 carrying a conical anti-friction power transmission roller 23.

The roller 23 is movable in a zig-zag groove 24 formed in the periphery of a disc 25 rigidly fastened on the axle 8 and rotatable therewith. This disc is confined in a suitable lubricating housing or casing 26.

The numerals 27 and 28 designate complemental clutch elements actuated through the medium of a clutch lever 29 suspended or mounted on the bracket 30. This arrangement allows the disc 25 to be rotated independently of or with the axle.

The numeral 31 in Figure 1 designates a bell-crank having an upstanding lever forming arm 32 carrying a pawl 33 engageable with the rack 34 and also including an arm 35 fastened by way of a link 36 to the aforesaid frame 13, thus permitting the frame to be raised or lowered to allow the cutter bar mechanism to be disposed in or out of operative position.

In the modified embodiment of drive as shown in Figure 7, the wheel or disc is generally designated by the numeral 37 and is here provided on its periphery with a zig-zag rib 38 co-operable with the forked end 39 of the lever 20a.

In either embodiment of the invention, it is obvious that when the clutch is thrown in, motion will be imparted to the lever 20, thus rocking it back and forth on its pivot. Inasmuch as this has ball and socket and linked connection with the toothed bar 16, it will be obvious that the bar will be reciprocated back and forth to produce the desired cutting operation.

Thus, the result is converting the rotary motion of the disc into reciprocatory motion of the toothed bar of the cutter bar mechanism.

The advantages claimed are:

First: Straight drive bar.—The power can be transmitted from the drive wheel to the cutter bar of the reaper or mower or wherever the alterating motion is required on other machinery better by means of a straight bar than by a bar that has a crook or bend that follows the drive wheel part way round before making connection. There will be less wrenching with a straight bar. This means less wear and strain at the pivotal point. It also eliminates the excessive friction occasioned by the crooked bar.

Second: Gear connection on drive shaft.— Strength and stability and reduction of friction is attained by maintaining the connections intact at all times between the drive bar and the drive wheel and making the connections for shifting gears (or throwing the machine into gear) directly between the drive shaft and the drive wheel. When in gear the drive wheel turns with the shaft; when out of gear the shaft turns without turning the drive wheel or may do. This leaves the drive bar free to operate without any tension except that that is incident to the transmission of power.

Third: Crank case in oil.—The encasing of the drive wheel so that it runs in oil at all times is a distinct advantage in reducing friction and adding to the life of the machine.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

In a structure of the class described, in combination, an axle, ground engaging and traction wheels associated with said axle, a disc mounted on said axle, clutch means for said disc, a lubricant containing casing for said disc, the disc being provided with a peripheral zig-zag groove, a frame rockably mounted on said axle, a lever pivotally mounted on said frame, a conical roller at the rear end portion of said lever receivable in said groove, cutter bar mechanisms, and an operating connection between said mechanisms and the forward end of said lever.

JOHN F. WILCOXSON.